US008413208B2

(12) United States Patent
Sunada

(10) Patent No.: US 8,413,208 B2
(45) Date of Patent: Apr. 2, 2013

(54) ACCESS CONTROL AND PROTOCOL/POLICY DETERMINATION BASED ON THE CLIENT'S ENVIRONMENT

(75) Inventor: Akira Sunada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1612 days.

(21) Appl. No.: 11/589,208

(22) Filed: Oct. 30, 2006

(65) Prior Publication Data

US 2007/0189303 A1   Aug. 16, 2007

(30) Foreign Application Priority Data

Feb. 10, 2006   (JP) .................................. 2006-033818

(51) Int. Cl.
 *G06F 17/00* (2006.01)
 *H04L 29/06* (2006.01)
(52) U.S. Cl. ................... 726/1; 726/28; 726/29; 726/30
(58) Field of Classification Search ........................ None
See application file for complete search history.

(56) References Cited

U.S. PATENT DOCUMENTS

| 5,204,961 | A  | * | 4/1993  | Barlow ............................ 726/1    |
| 6,480,963 | B1 | * | 11/2002 | Tachibana et al. ................ 726/4    |
| 7,434,257 | B2 | * | 10/2008 | Garg et al. ....................... 726/21  |
| 2004/0128394 | A1 | * | 7/2004  | Knauerhase et al. ......... 709/229 |
| 2006/0277590 | A1 | * | 12/2006 | Limont et al. .................... 726/1  |
| 2008/0066148 | A1 | * | 3/2008  | Lim ................................. 726/1    |

FOREIGN PATENT DOCUMENTS

| CN | 1685689 A      | 10/2005 |
| JP | A-10-269184    | 10/1998 |
| JP | A-2000-138703  | 5/2000  |
| JP | A 2002-207636  | 7/2002  |
| JP | A-2003-228520  | 8/2003  |
| JP | A 2004-295245  | 10/2004 |
| JP | A-2006-11976   | 1/2006  |

OTHER PUBLICATIONS

Chinese Office Action issued Jul. 3, 2009 for Chinese Application No. 200610148478.4 (with translation).
Japanese Patent Office, Refusing Reason Notice for Patent Application 2006-33818.(with English translation), mailed Feb. 15, 2011, pp. 1-3.

* cited by examiner

*Primary Examiner* — Nadia Khoshnoodi
(74) *Attorney, Agent, or Firm* — Oliff & Berridge, PLC

(57) ABSTRACT

A computer readable medium stores a data management program that manages data, provides the data to a client connected over a network, and is capable of performing communications in accordance with a plurality of types of protocols, the data management program causing a computer to execute a process for the data management, the process comprising managing an access right to the data; managing basic policy information concerning a protocol used for providing the data to the client; managing protocol information that sets, for each protocol, data capable of using the protocol as a protocol used for providing the data; analyzing an environment of the client when a data request from the client is received; and determining a protocol used for providing the requested data according to the analyzed client environment, the access right, the basic policy information and the protocol information.

6 Claims, 5 Drawing Sheets

FIG. 2

DATA INFORMATION

| DATA ID (UUID) | DATA ADDRESS |
|---|---|
| fc77e817-da45-470c-9bdc-aed61ec5f3cd | c:¥data¥data1 |
| aca622ce-8793-42eb-a0cb-cae8f7659ebb | c:¥data¥data2 |
| ⋮ | ⋮ |

FIG. 4

USER INFORMATION

| DATA ID (UUID) | FAMILY NAME | GIVEN NAME | ... |
|---|---|---|---|
| c08263a7-d721-403d-9196-09c73598267d: RM | FUJI | TARO | ... |
| 5c12e675-46d7-400e-8a72-a45934d83b5f: RW | FUJI | HANAKO | ... |
| ⋮ | ⋮ | ⋮ | ⋮ |

FIG.3

ACCESS INFORMATION

| DATA ID (UUID) | ACCESS RIGHT |
|---|---|
| fc77e817-da45-470c-9bdc-aed61ec5f3cd | c08263a7-d721-403d-9196-09c735f98267d: RW |
| | 5c12e675-46d7-400e-8a72-a45934d83b5f: RW |
| aca622ce-8793-42eb-a0cb-cae8f7659ebb | c08263a7-d721-403d-9196-09c735f98267d: R |
| ... | ... |

FIG.5

POLICY INFORMATION

| POLICY | STATE |
|---|---|
| USE OF SSL | ENABLE |
| NON-SSL CONNECTION ADMISSION USER LIST | c08263a7-d721-403d-9196-09c73598267d |
|  | ⋮ |
| SSL IS NOT USED IN LOCAL ACCESS | ENABLE |
| DISPLAY OF DATA UNOBTAINABLE UNLESS SSL IS USED | ENABLE |
| ⋮ | ⋮ |

FIG.6

PROTOCOL INFORMATION

| DATA ID (UUID) | EXCLUDING INFORMATION |
|---|---|
| fc77e817-da45-470c-9bdc-aed61ec5f3cd | EXCLUDED ACL: M |
| aca622ce-8793-42eb-a0cb-cae8f7659ebb | EXCLUDED USER: 5c12e675-46d7-400e-8a72-a45934d83b5f |
| ⋮ | ⋮ |

ACCESS CONTROL AND PROTOCOL/POLICY DETERMINATION BASED ON THE CLIENT'S ENVIRONMENT

BACKGROUND

1. Technical Field

The present invention relates to a storage medium having stored therein a data management program, a computer data signal, device and method for management of data, a protocol switching device and method, and a storage medium having stored therein a protocol switching program, and more particularly to a storage medium having stored therein a data management program to provide a client with data in response to a request from the client, a computer data signal, device and method for management of data, a protocol switching device and method, and a storage medium having stored therein a protocol switching program.

2. Related Art

In recent years, a network device, such as a digital multifunctional device connected to a network, has a Web server function, and a client on the network can browse data stored in the network device using a Web browser or the like.

Since applications used for data communications vary depending on clients, an automatic selection is desirable for an optimum protocol in accordance with the clients.

SUMMARY

According to an aspect of the invention, there is provided a computer readable medium storing a data management program that manages data, provides the data to a client connected over a network, and is capable of performing communications in accordance with a plurality of types of protocols, the data management program causing a computer to execute a process for the data management, the process comprising managing an access right to the data; managing basic policy information concerning a protocol used for providing the data to the client; managing protocol information that sets, for each protocol, data capable of using the protocol as a protocol used for providing the data; analyzing an environment of the client when a data request from the client is received; and determining a protocol used for providing the requested data according to the analyzed client environment, the access right, the basic policy information and the protocol information.

BRIEF DESCRIPTION OF THE DRAWINGS

Exemplary embodiments of the present invention will be described in detail based on the following figures, wherein:

FIG. 2 illustrates an example of data information managed by a data management section;

FIG. 3 illustrates an example of access information managed by an access right management section;

FIG. 4 illustrates an example of user information managed by a user information management section;

FIG. 5 illustrates an example of policy information managed by a policy information management section;

FIG. 6 illustrates an example of protocol information managed by a protocol information management section.

DETAILED DESCRIPTION examplary embodiment of a storage medium having stored therein a data management program, a data-managing computer data signal, device and method, a protocol switching device and method, and a storage medium having stored therein a protocol switching program according to the present invention will be described in detail with reference to the accompanying figures.

Figure 1:
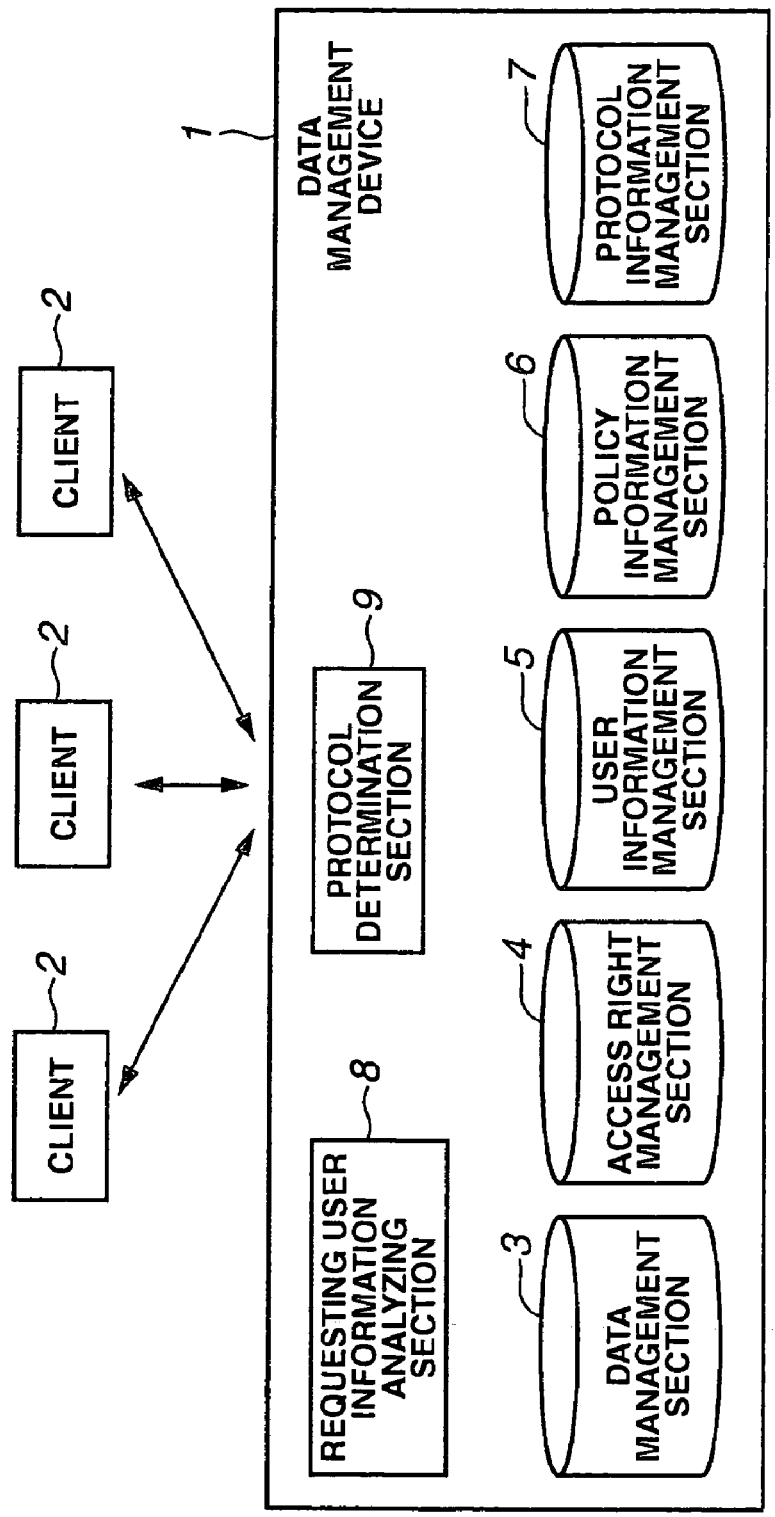
FIG. 1 illustrates an example of a schematic structure of a data management device according to an examplary embodiment of the invention.

FIG. 1 illustrates an example of a schematic structure of a data management device 1 according to an examplary embodiment of the invention.

As shown in FIG. 1, the data management device 1 is connected to clients 2 such as plural PCs and the like through a network and provides the clients 2 with the data being managed through the network.

As shown in FIG. 1, the data management device 1 comprises a data management section 3, an access right management section 4, a user information management section 5, a policy information management section 6, a protocol information management section 7, a requesting user information analyzing section 8, and a protocol determination section 9.

The data management device 1 can be realized in hardware by a general-purpose server computer, and the processing functions possessed by each of these components 3 to 9 can be shown by executing on the server computer the data management program according to the invention. Each of the components 3 to 9 can also be configured in hardware by using ICs and the like.

The data management section 3 manages information related to data (hereinafter called "data information") stored in a storage device. FIG. 2 illustrates an example of the data information managed by the data management section 3. As shown in FIG. 2, a data ID and a storage space for data indicated by the data ID are managed as the data information. In addition, a summary of data, a keyword of data, etc. can also be managed as the data information.

The access right management section 4 holds an access right to data being managed (hereinafter called "access information") by the data management section 3 and controls the access right of the user to data. FIG. 3 illustrates an example of the access information managed by the access right management section 4. As shown in FIG. 3, the data ID, the user ID with the access right to data indicated by the data ID being set, and an access right of the user ID (for example, R, W, M) are managed as the access information.

The user information management section 5 manages information such as a user ID, a name, etc. about the user (hereinafter called "user information"). FIG. 4 illustrates an example of the user information managed by the user information management section 5. As shown in FIG. 4, the user ID and the user's full name indicated by the user ID are managed as the user information. In addition, information on member, etc. to which the user belongs can also be managed as the user information.

The policy information management section 6 manages a policy which is a basic policy of the whole data management device 1 (hereinafter called "policy information"), and manages the policy information on a protocol to the whole request as a type of policy therein.

FIG. 5 illustrates an example of the policy information managed by the policy information management section 6. The policy information shown in FIG. 5 relates to switching between SSL (Secure Socket Layer) and non-SSL. For example, in the data management device 1 in which the policy information shown in FIG. 5 is set, "enable" is set for the policy of "use of SSL", whereby a protocol with respect to the whole request to the data management device 1 is set such that the SSL is always used. Further, "c08263a7-d721-403d-9196-09c73598267d" is set for the policy of "non-SSL connection admission user list", whereby a request from user ID for "c08263a7-d721-403d-9196-09c73598267d" is set such that the SSL does not necessarily have to use. Further, "enable" is set for the policy of "SSL is not used in local access", whereby it is set not to use the SSL in local access. Further, "enable" is set for the policy of "display of data unobtainable unless SSL is used", whereby it is set to indicate data that cannot be obtained unless the SSL is used.

The protocol information management section 7 manages data that can use the protocol at the time of providing the protocol with data (hereinafter called "protocol information").

FIG. 6 illustrates an example of the protocol information managed by the protocol information management section 7. In the protocol information shown in FIG. 6, data is set that is capable of using the protocol when the data is provided to an any protocol, and excluding information to the data is also set. For example, in the data management device 1 in which the protocol information shown in FIG. 6 is set, "excluded ACL (Access Control List) (access right): M" is set for data ID "fc77e817-da45-470c-9bdc-aed61ec5f3cd", whereby it is set that only the user having access right "M" to data ID "fc77e817-da45-470c-9bdc-aed61ec5f3cd" does not necessarily have to use a protocol set to make a request for data indicated by the data ID "fc77e817-da45-470c-9bdc-aed61ec5f3cd". Further, "excluded USER (user): "5c12e675-46d7-400e-8a72-a45934d83b5f"" is set for data ID "aca622ce-8793-42eb-a0cb-cae8f7659ebb", whereby it is set that only the user ID "5c12e675-46d7-400e-8a72-a45934d83b5f" does not necessarily have to use a protocol set to make a request for data indicated by the data ID "aca622ce-8793-42eb-a0cb-cae8f7659ebb".

The requesting user information analyzing section 8 analyzes a login state of the user having made a request to the data management device 1 for data, environments (for example, address information etc.) of the client 2, and a protocol used for the data request by the client 2 (hereinafter called "the request protocol").

The protocol determination section 9 executes processing to determine a protocol used to provide the requested data according to the login state of the user and the environments of the client 2 analyzed by the requesting user information analyzing section 8, the policy related to the protocol of the data management device 1 being managed by the policy information management section 6, the access right of the user to the requested data being managed by the access right management section 4, and the protocol information being managed by the protocol information management section 7.

Figure 7:
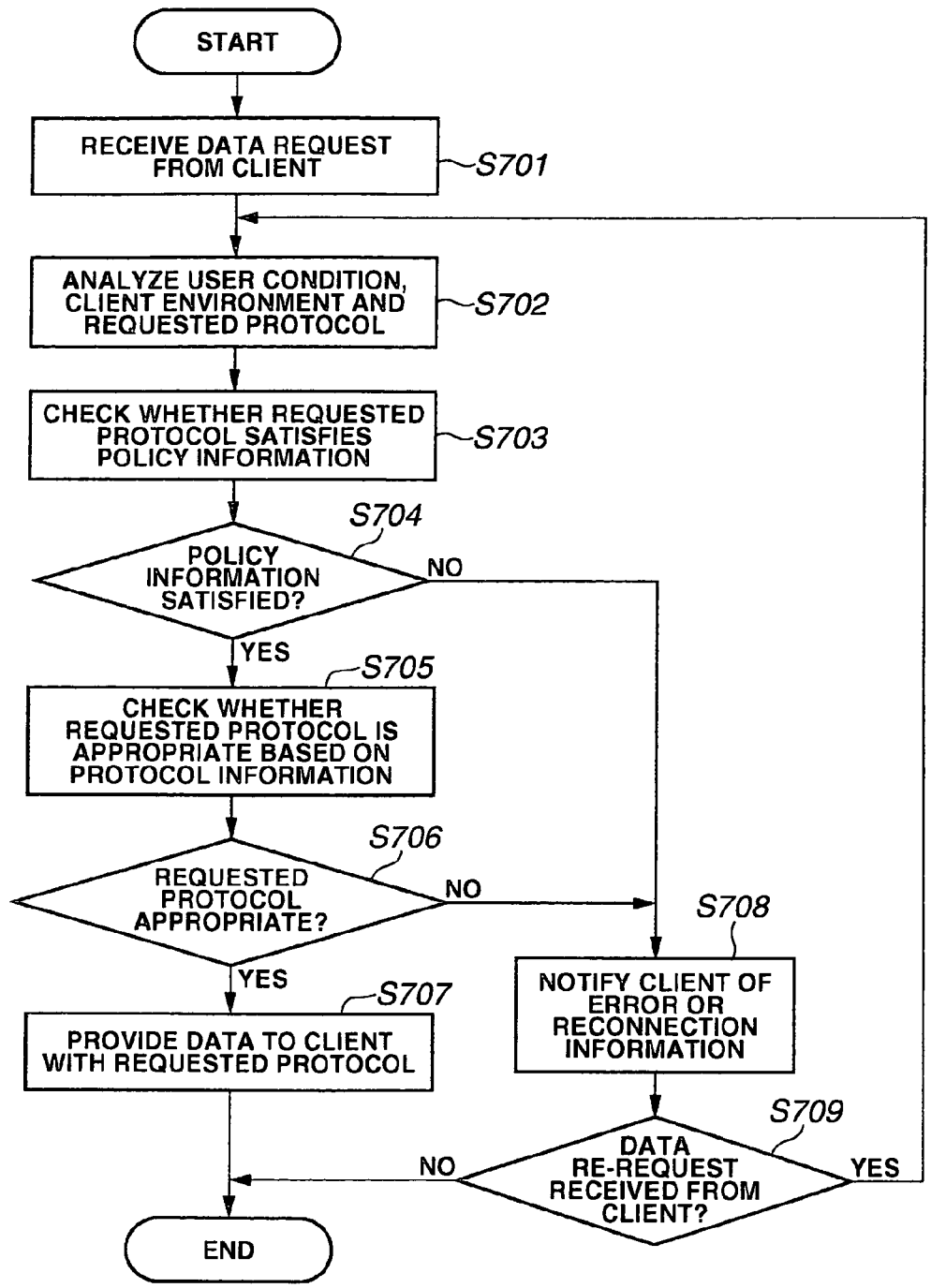
FIG. 7 is a flow chart illustrating a procedure of a communications protocol determination processing performed by a data management device.

Then, the procedure of the communications protocol determination processing executed by the data management device will be described with reference to the flow chart shown in FIG. 7.

When a data request from a client is received (step S701), the requesting user information analyzing section 8 analyzes the login state of the user, the environments of the client and the requested protocol (step S702). The protocol determination section 9 checks whether the requested protocol satisfies the policy information being managed by the policy information management section (step 703), and if the requested protocol satisfies the policy information (YES in step 704), the procedure advances to step S705, but if the requested protocol does not satisfy the policy information (NO in step S704), the procedure advances to step S708.

Where the requested protocol satisfies the policy information (YES in step S704), the protocol determination section 9 checks whether the requested protocol is appropriate according to the protocol information being managed by the protocol information management section 7 (step S705), and if the requested protocol is appropriate (YES in step S706), the procedure advances to step S707, but if the requested protocol is not appropriate (NO in step S706), the procedure advances to step S708.

Where the requested protocol is appropriate (YES in step S706), the client is provided with data in accordance with the requested protocol (step S707), and the procedure of the protocol determination processing is terminated.

Where the requested protocol does not satisfy the policy information in step S704 (NO in step S704) or where the requested protocol is not appropriate in step S706 (NO in step S706), error or connection protocol information and reconnection information are informed to the client (step S708). Where a data re-request from the client is received (YES in step S709), the procedure returns to step S702, and where a data re-request from the client is not received (NO in step S709), the procedure of the protocol determination processing is terminated.

Where a reconnection request is notified to the client, the client satisfies the policy information according to the reconnection information, and where an appropriate protocol is used according to the protocol information to make a data re-request to the data management device, it is not necessary to check again whether the policy information is satisfied and to check whether the requested protocol is appropriate. Therefore, where reconnection is made by the client after the reconnection request is notified to the client, data may be provided in accordance with the requested protocol to the client without executing the above checks. Specifically, the procedure of the protocol determination processing may be terminated even when the data re-request from the client is received in step S709 of the flow chart shown in FIG. 7 (YES in step S709). As processing of execution, for example, where the client 2 requests the data management device 1 for data through an RMI (Remote Method Invocation) connection, if the data management device 1 adopts the policy of use of SSL, the reconnection information that requests the use of SSL is notified to the client 2, and the client 2 switches the protocol to the RMI over SSL to make reconnection according to the reconnection information, thereby to obtain the data from the data management device 1.

When the client 2 requests the data management device 1 for data in accordance with HTTP, if the data management device 1 has the SSL use policy, reconnection information (redirect status 302) that requests the use of SSL is notified to the client 2, and the client 2 switches the protocol to HTTPS to make reconnection according to the request and can obtain the data from the data management device 1.

In other words, in response to the data request from the client 2, the policy of the data management device 1, the access right to the requested data and the environment of the client 2 at the time of the data request are considered to determine a protocol used for provision of data, and switching of the protocol is requested to the client 2 if necessary. Thus, the switching of protocols considering the relationship with the server environment and the request environment of the client 2 described in connection with the subject can be realized.

The foregoing description of the exemplary embodiments of the present invention bas been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a data management program that manages data, provides the data to a client connected over a network, and is configured to perform communications in accordance with a plurality of types of protocols, the data management program causing a computer to execute a process for the data management, the process comprising:
   managing an access right of a user to the data;
   managing basic policy information concerning the plurality of types of protocols used in providing the data to the client with respect to a data management device as a whole;
   managing protocol information that sets, for each of the plurality of types of protocols, data configured to utilize each of the plurality of types of protocols for providing the data;
   analyzing an environment of the client when a request for data is received from the client;
   determining a required protocol to provide the requested data to the client in accordance with the analyzed client environment, the access right, the basic policy information and the protocol information;
   comparing a requested protocol used in the client request for data with the required protocol;
   determining whether the requested protocol is different from the required protocol; and
   if the requested protocol is different from the required protocol, requesting the client to reconnect using the required protocol, wherein upon reconnection, a re-determination of the required protocol used in providing the requested data does not occur,
   wherein the protocol information further includes excluding information that enables access to the data without requiring the client to use the required protocol if at least one of the following is satisfied: (1) the user of the client is specified in the excluding information, and (2) the user of the client has the access right specified in the excluding information.

2. The non-transitory computer readable medium storing a data management program according to claim 1, the process further comprising:
   analyzing a login state of the user as the client environment; and
   determining the required protocol used in providing the requested data further in accordance with the client environment including the login state of the user, the access right, the basic policy information, and the protocol information.

3. A data management device that manages data, provides the data to a client connected over a network and is configured to perform communications in accordance with a plurality of types of protocols, comprising:
   an access right managing section that manages an access right of a user to the data;
   a basic policy information managing section that manages basic policy information concerning each of the plurality of types of protocols used in providing the data to the client with respect to a data management device as a whole;
   a protocol information managing section that manages protocol information that sets, for each of the plurality of types of protocols, data configured to utilize each of the plurality of types of protocols for providing the data;
   an analyzing section that analyzes an environment of the client environment when a request for data is received from the client;
   a protocol determining section that determines a required protocol used in providing the requested data in accordance with the client environment analyzed by the analyzing section, the access right being managed by the access right managing section, the basic policy information being managed by the basic policy information managing section, and the protocol information being managed by the protocol information managing section, wherein
   the analyzing section further compares the requested protocol used for the data request from the client with the required protocol and determines whether the requested protocol is different from the required protocol; and
   a requesting section that, if the requested protocol is different from the required protocol, requests the client to reconnect using the required protocol, wherein upon reconnection, the protocol determining section does not re-determine the protocol used in providing the requested data,
   wherein the protocol information further includes excluding information that enables access to the data without requiring the client to use the determined protocol if at least one of the following is satisfied: (1) the user of the client is specified in the excluding information, and (2) the user of the client has the access right specified in the excluding information.

4. The data management device according to claim 3, further comprising:
   the analyzing section that further analyzes a login state of the user as the client environment; and
   the determining section that further determines the required protocol used in providing the requested data in accordance with the client environment including the login state of the user, the access right, the basic policy information and the protocol information.

5. A data management method that manages data, provides the data to a client connected over a network and is capable of performing communications in accordance with a plurality of types of protocols, comprising:
   managing an access right of a user to the data;
   managing basic policy information concerning the plurality of types of protocols used in providing the data to the client with respect to a data management device as a whole;
   managing protocol information that sets, for each of the plurality of types of protocols, data configured to utilize each of the plurality of types of protocols for providing the data;
   analyzing an environment of the client when a request for data is received from the client;

determining a required protocol to provide the requested data to the client in accordance with the analyzed client environment, the access right, the basic policy information and the protocol information;

comparing a requested protocol used in the client request for data with the required protocol;

determining whether the requested protocol is different from the required protocol; and if the requested protocol is different from the required protocol, requesting the client to reconnect using the required protocol, wherein upon reconnection, a re-determination of the required protocol used in providing the requested data does not occur, wherein the above steps are performed by a general purpose computer, wherein the protocol information further includes excluding information that enables access to the data without requiring the client to use the required protocol if at least one of the following is satisfied: (1) the user of the client is specified in the excluding information, and (2) the user of the client has the access right specified in the excluding information.

6. The data management method according to claim 5, further comprising:

analyzing a login state of the user as the client environment; and determining the required protocol used in providing the requested data further in accordance with the client environment including the login state of the user, the access right, the basic policy information and the protocol information.

* * * * *